Figure 1:
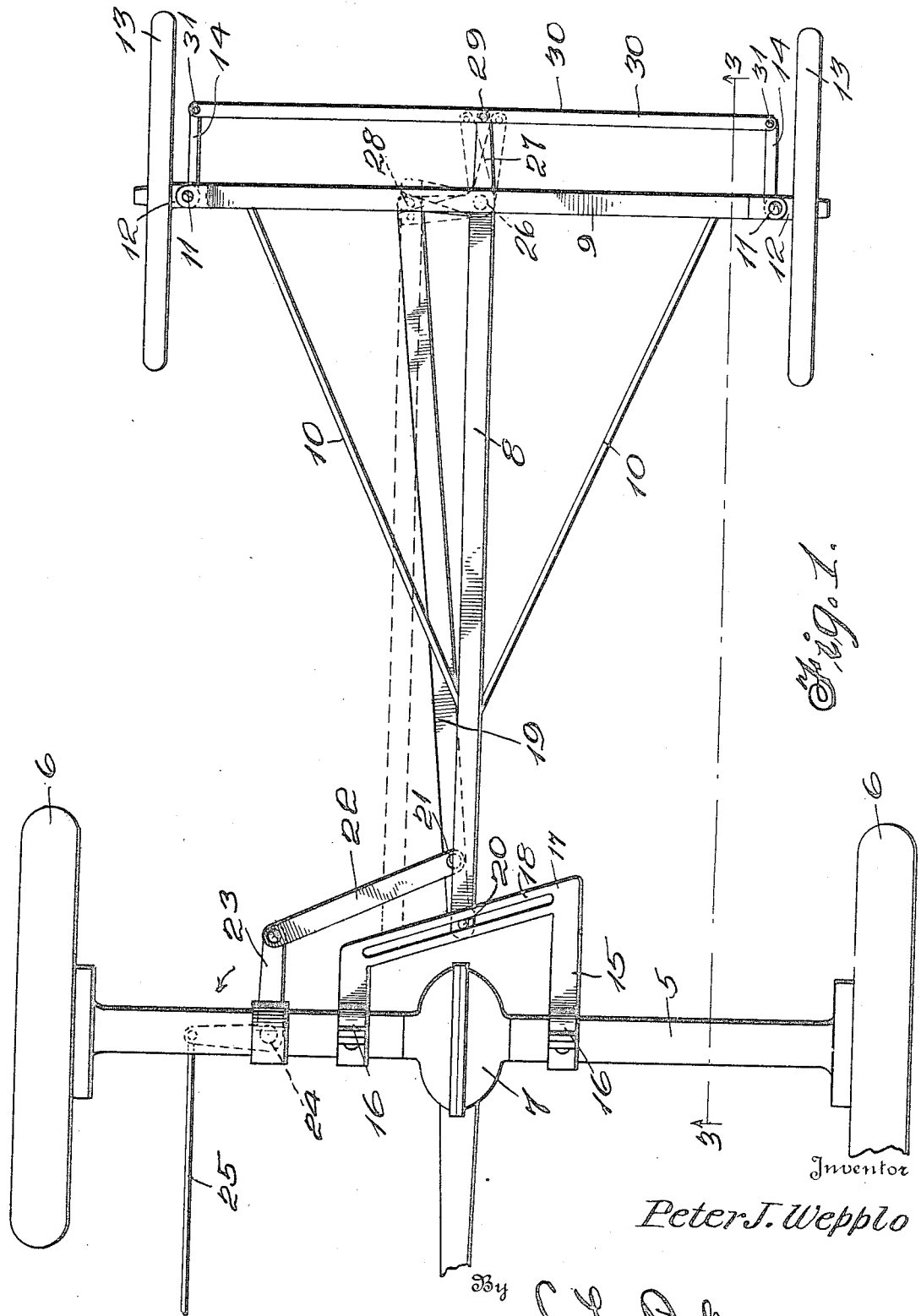

P. J. WEPPLO.
TRAILER FOR VEHICLES.
APPLICATION FILED JULY 5, 1916.

1,213,440.

Patented Jan. 23, 1917.
2 SHEETS—SHEET 1.

Inventor
Peter J. Wepplo
By C. L. Parker
Attorney

P. J. WEPPLO.
TRAILER FOR VEHICLES.
APPLICATION FILED JULY 5, 1916.
1,213,440.
Patented Jan. 23, 1917.
2 SHEETS—SHEET 2.
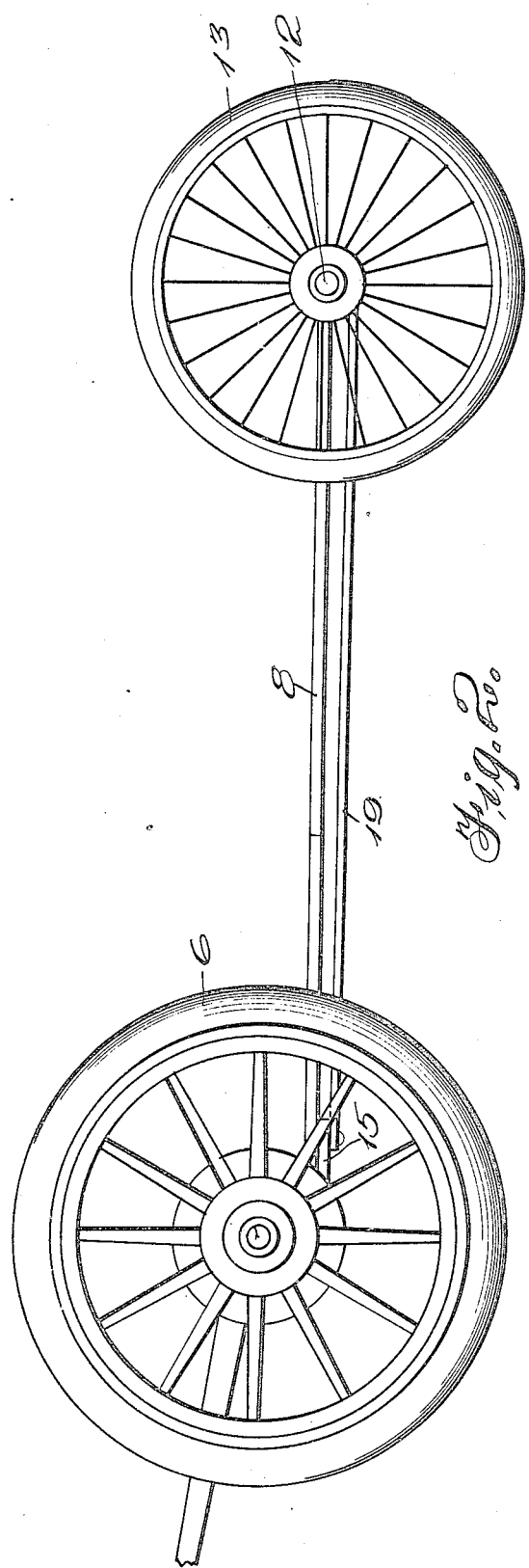
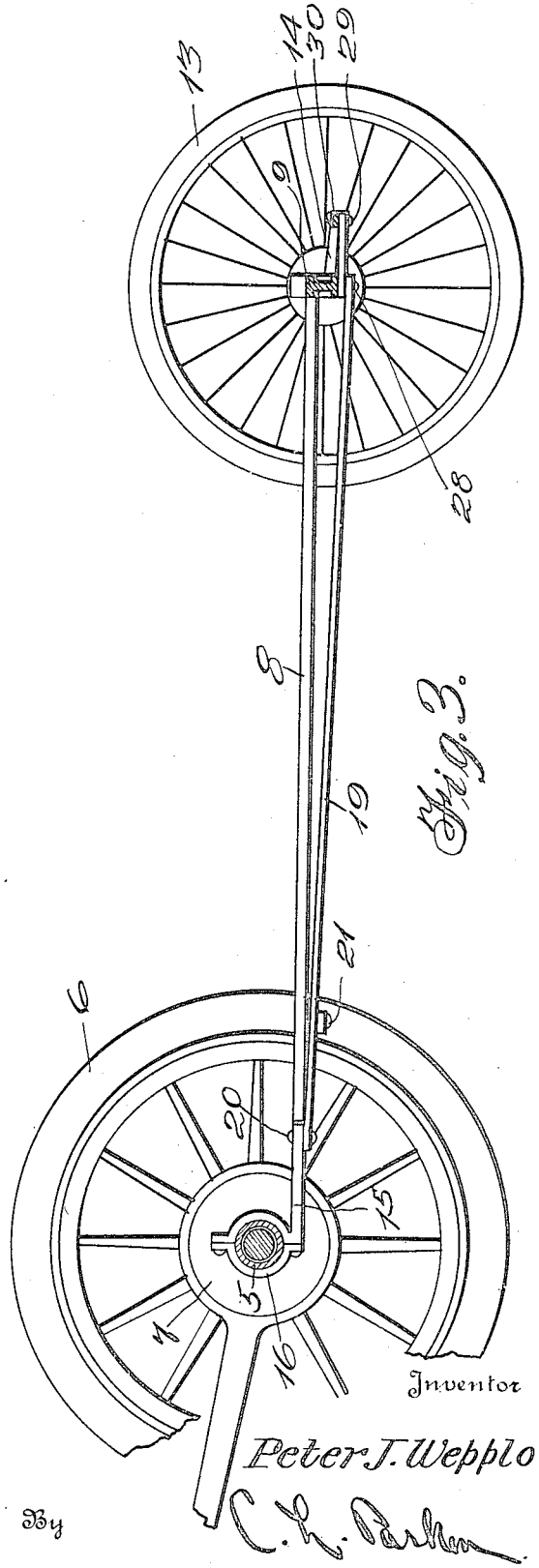
Inventor
Peter J. Wepplo
By
C. L. Parker
Attorney

UNITED STATES PATENT OFFICE.

PETER J. WEPPLO, OF FRANKLIN, MINNESOTA.

TRAILER FOR VEHICLES.

1,213,440.   Specification of Letters Patent.   Patented Jan. 23, 1917.

Application filed July 5, 1916. Serial No. 107,822.

*To all whom it may concern:*

Be it known that I, PETER J. WEPPLO, a citizen of the United States, residing at Franklin, in the county of Renville and State of Minnesota, have invented certain new and useful Improvements in Trailers for Vehicles, of which the following is a specification.

My invention relates to improvements in trailers having means for steering the wheels thereof, such trailers being adapted for attachment to automobiles or like vehicles.

An important object of the invention is to provide a construction of the above mentioned character, which is simple, inexpensive to manufacture, convenient in use, strong and durable.

Other objects and advantages of the invention will be apparent during the course of the following description.

In the accompanying drawings forming a part of this specification and in which like numerals are employed to designate like parts throughout the same, Figure 1 is a plan view of apparatus embodying the invention, Fig. 2 is a side elevation of the same, and, Fig. 3 is a longitudinal section taken on line 3—3 of Fig. 1.

In the drawings, wherein for the purpose of illustration is shown a preferred embodiment of my invention, the numeral 5 designates the rear axle casing of an automobile, carrying the usual wheels 6. This axle casing is provided with a differential gear casing 7, as is customary.

My trailer comprises a frame including a longitudinal pole or beam 8, rigidly connected with an axle 9. This pole and axle are further connected by diagonal brace rods 10, as shown. Pivotally connected, as shown at 11, with the ends of the axle 9 are spindles 12, to swing in a horizontal plane. These spindles 12 have wheels 13 rotatable thereon. The spindles 12 have steering arms 14 rigidly connected therewith and preferably projecting rearwardly therefrom.

Rigidly connected with the forward end of the pole 8 is an approximately U-shaped frame 15, the ends of which are provided with clamps 16, receiving the axle casing 5 upon opposite sides of the casing 7. The transverse inclined portion 17 of this approximately U-shaped frame is provided with an inclined slot or guide-way 18, extending longitudinally of the axle casing 5.

Preferably arranged beneath the pole 8 is a rigid link 19, provided at its forward end with a pin or pivot element 20, operating in the slot 18, as shown. Connected with the rigid link 19 at a point 21, arranged near and spaced a substantial distance from the forward end thereof, is a rigid link 22, having pivotal connection with a bell-crank lever 23 which is pivotally connected with the axle casing 15, as shown at 24. This bell-crank lever 23 is connected with a rigid rod 25, which extends forwardly for connection with suitable means, not shown, arranged in convenient reach of the operator of the propelling vehicle, so that the rod 25 can be moved forwardly and rearwardly, at will.

Preferably arranged beneath the axle 9 and pivoted thereto, as shown at 26, is a bell-crank lever 27, having pivotal connection with the link 19, as shown at 28. This bell-crank lever 27 has pivotal connection, as shown at 29, with a drag link 30, pivoted to the ends of the steering arms 14, as shown at 31.

The body portion of the trailer or a box (not shown) may be arranged upon the frame comprising the pole 8 and axle 9, as is obvious.

The operation of the apparatus is as follows: When the propelling automobile is turning to the left, the rod 25 is moved rearwardly, swinging the bell-crank lever 23 inwardly upon its pivot. The movement of this bell-crank lever moves the link 22 inwardly, and this link shifts the forward end of the link 19 from its neutral position to an outer position upon the left of the pole 8. Owing to the inclination of the slot 18 the link 19 will move rearwardly longitudinally for swinging the bell-crank lever 27 upon its pivot. The drag link 30 is shifted to the left and the wheels 13 turned to the right so that the trailer can properly follow the propelling automobile. It is obvious that the opposite of this operation takes place when the propelling automobile is turning to the right.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A trailer for a propelling vehicle, comprising a frame adapted for arrangement behind and connection with the vehicle and provided with a substantially relatively stationary guide element extending transversely thereof, wheels connected with the frame for supporting the same, means to operate the wheels for steering the frame, and a member connected with the means and carrying an element contacting with the transverse guide element to move longitudinally of the guide element.

2. A trailer for a propelling vehicle, comprising a frame adapted for arrangement behind and connection with the vehicle and provided with an angularly arranged transverse guide element having a longitudinal opening, wheels connected with the frame for supporting the same, means to operate the wheels for steering the frame, and a link connected with the means and carrying an element operating within the longitudinal opening of the inclined transverse guide element.

3. A trailer for a propelling vehicle, comprising a frame, wheels connected with the rear end of the frame, steering means for the wheels, an approximately U-shaped frame connected with the forward end of the first named frame and adapted for attachment to the propelling vehicle and having an inclined transverse slot, a link connected with the steering means, and a pin carried by the forward end of the link and operating in the slot.

In testimony whereof I affix my signature in presence of two witnesses.

PETER J. WEPPLO.

Witnesses:
 FRANK HOPKINS,
 GLADYS HOPKINS.